J. H. RAND, Jr.
INDEX OR DISPLAY DEVICE.
APPLICATION FILED JAN. 5, 1920.

1,435,081.

Patented Nov. 7, 1922.
5 SHEETS—SHEET 1.

INVENTOR.
James H. Rand Jr
By
Parker & Prochnow.
ATTORNEYS.

J. H. RAND, Jr.
INDEX OR DISPLAY DEVICE.
APPLICATION FILED JAN. 5, 1920.

1,435,081.

Patented Nov. 7, 1922.

INVENTOR.
James H Rand Jr
By Parker & Prochurd
ATTORNEYS.

Patented Nov. 7, 1922.

1,435,081

UNITED STATES PATENT OFFICE.

JAMES H. RAND, JR., OF TONAWANDA, NEW YORK.

INDEX OR DISPLAY DEVICE.

Application filed January 5, 1920. Serial No. 249,604.

*To all whom it may concern:*

Be it known that I, JAMES H. RAND, Jr., a citizen of the United States, residing at Tonawanda, in the county of Erie and State of New York, have invented a new and useful Improvement in Index or Display Devices, of which the following is a specification.

This invention relates to index or display devices of the kind comprising a plurality of leaves or holders for the cards or articles to be displayed, which are movable by means of a selective device into positions to render any desired leaf accessible.

The objects of the invention are to provide a device of this kind with mechanism for enabling an operator to rapidly turn to the desired leaf; also to provide a device of this kind with motor operated means for turning the leaves or holders to the desired positions; also to provide a device of this kind with a keyboard or other selective device from which the operation of the device can be controlled; also to hinge the leaves on inclined axes on a rotatable stand or support which causes the leaves to move by gravity to an accessible position; also to provide means whereby each key or controlling device, when actuated causes the stand to be rotated by the operating motor and causes the rotation to cease when the desired leaf or holder is in an accessible position; also to improve the construction of devices of this kind in other respects hereinafter specified.

Briefly stated, the apparatus which is shown in the drawings as embodying the invention comprises a stand or support on which a plurality of leaves or holders for the cards or other articles are mounted and which is movable to bring any of the leaves to an accessible position, the movement of the stand or support being effected by means of a motor controlled by a keyboard or the like and being automatically stopped when the stand reaches that position.

Figure 3:
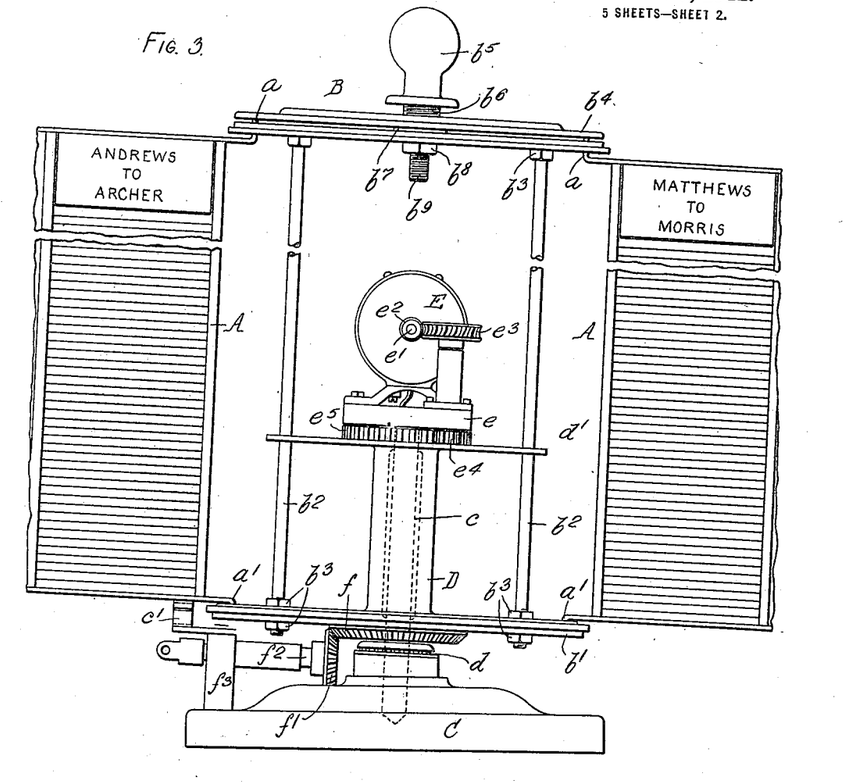
Fig. 3 is a fragmentary side elevation thereof on an enlarged scale, showing some of the leaves removed to show the rotatable support.
Figure 4:
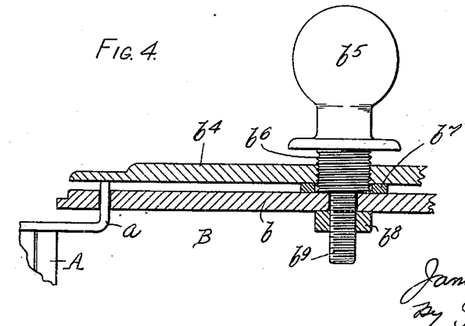
Fig. 4 is a fragmentary sectional elevation thereof on an enlarged scale, on line 4—4, Fig. 2, showing the retaining means for the upper portions of the leaves.
Figure 5:
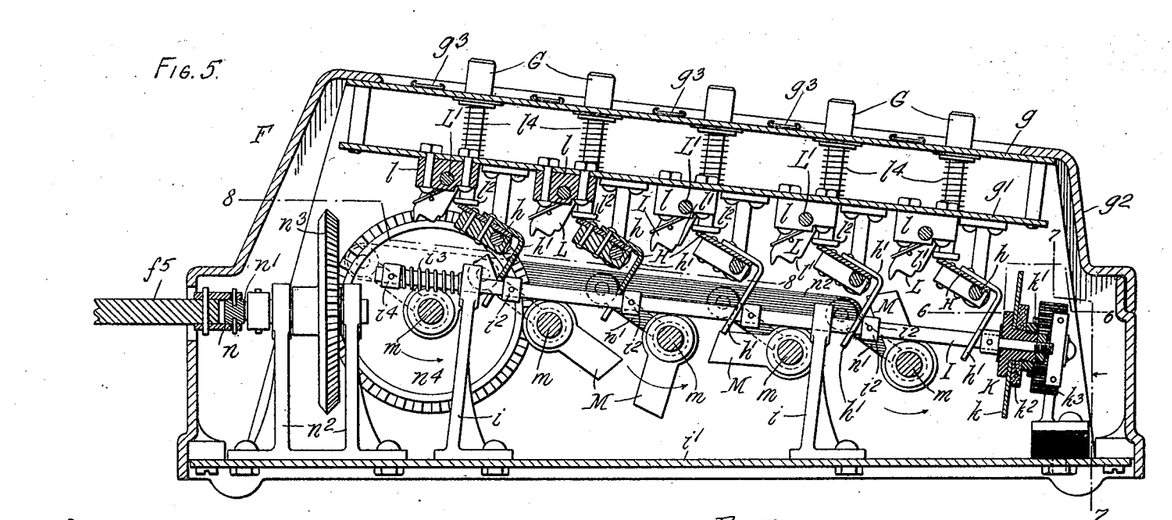
Fig. 5 is a longitudinal central sectional elevation of the controlling means for the leaf selecting mechanism.
Figure 6:
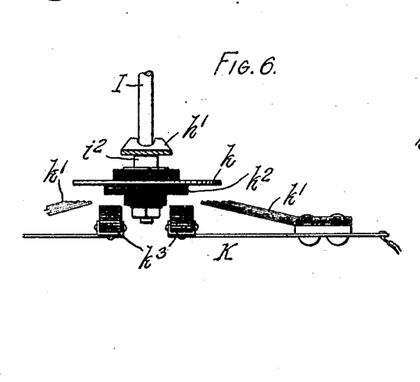
Fig. 6 is a fragmentary plan view thereof, on line 6—6, Fig. 5, showing the switch for controlling the operation of the motor for rotating the leaf support.
Figure 7:
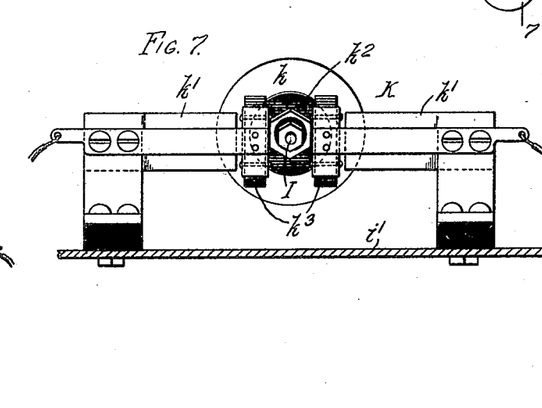
Fig. 7 is a fragmentary sectional elevation thereof on line 7—7, Fig. 5.
Figures 8, 9, 10:
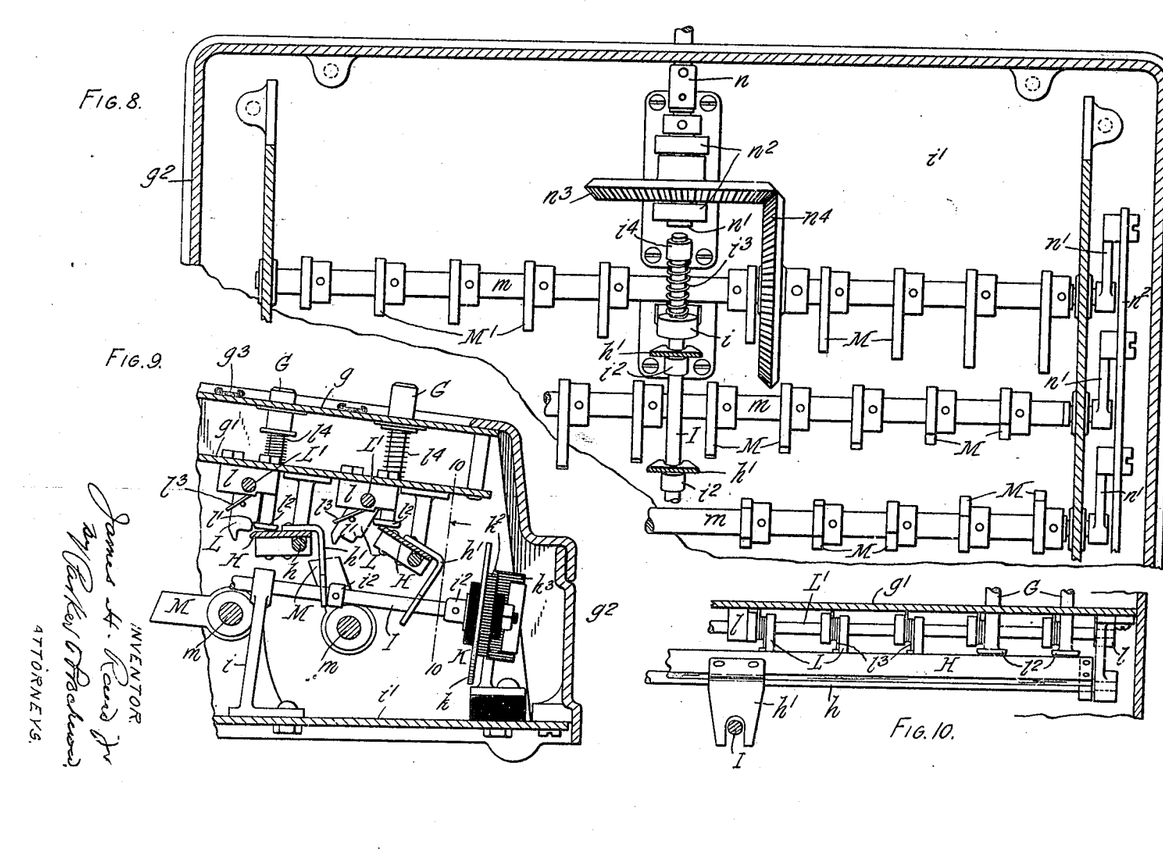
Fig. 8 is a fragmentary sectional plan view thereof on line 8—8, Fig. 5.
Fig. 9 is a fragmentary longitudinal sectional elevation thereof, similar to Fig. 5, showing the parts in different positions.
Fig. 10 is a fragmentary sectional elevation on line 10—10, Fig. 9.
Figure 11:
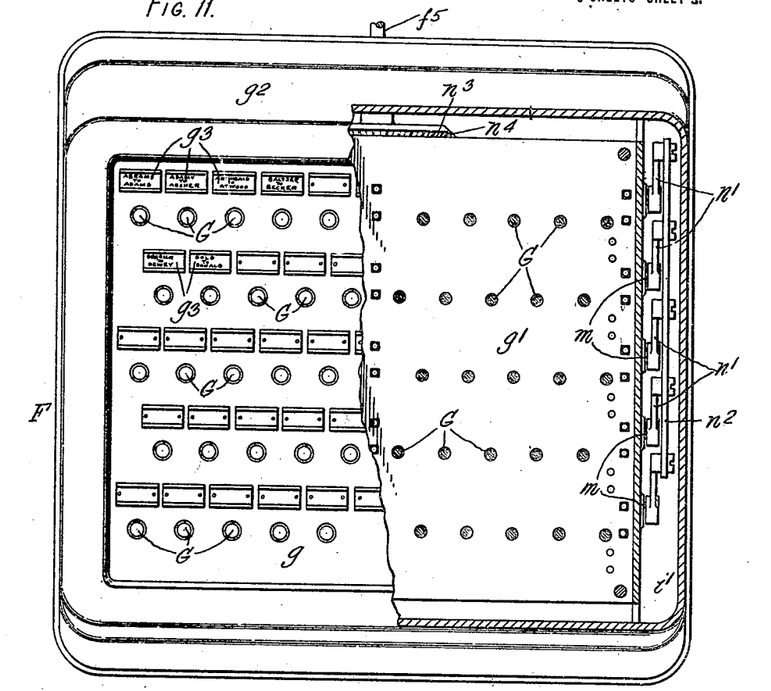
Fig. 11 is a plan view, partly in section, of the controlling means for the leaf selecting mechanism.
Figure 12:
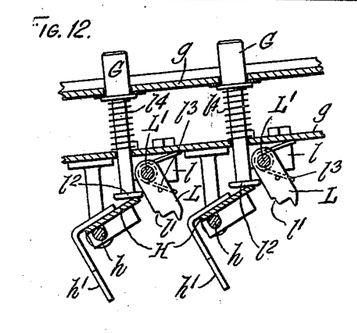
Fig. 12 is a fragmentary sectional elevation thereof showing two of the selecting keys and the parts connected therewith.

A represents the leaves or holders on which the cards or other articles (not shown), are held, and which in the construction shown are substantially rectangular in shape and are suitably mounted on a support B which is movable to bring one or another of the leaves into the desired position. The leaves shown in the drawings are provided with upper and lower pivots or pintles $a$ $a'$ which enter holes arranged in upper and lower plates or disks $b$ $b'$ forming a part of the stand or support B. The upper and lower plates $b$ $b'$ are preferably secured together by means of connecting or spacing rods $b^2$ having threaded ends extending through holes in the upper and lower plates and holding the plates in adjusted relation to each other by means of nuts $b^3$. The lower pivots or pintles $a'$ are made comparatively short and the upper pivots $a$ are longer, the distance between the upper and lower plates $b$ $b'$ being such that any leaf or holder A can be removed from the support B by raising the leaf to disengage the lower pivot $a'$ from the plate $b'$. In order to prevent the accidental removal of the holders A from the support B, means are preferably provided for normally preventing the raising of the leaves A to disengage the lower pivots $a'$ thereof from the lower plate $b'$. In the construction shown for this purpose, a leaf-securing disk or plate $b^4$ is provided which is adapted to engage the upper ends of the pivots $a$ to prevent the raising of the leaves A. This plate is held in fixed relation to the upper plate $b$ by means of a stud or knob $b^5$ having a threaded portion $b^6$ engaging a threaded hole in the leaf-securing plate $b^4$ the leaf-securing plate being turned about the stud or knob $b^5$ to enable the plate $b^4$ to be raised when the leaves are to be removed or to be placed in the lower position shown in Figs. 3 and 4 against a washer or stop $b^7$ when in leaf-retaining position. The knob or stud $b^5$ may be secured on the upper plate $b$ in any suitable means, for example by a nut $b^8$ engaging a reduced thread portion $b^9$ on the stud and clamping the stud on the plate $b$. The leaf-securing plate can be locked in its lower position by any suitable means to prevent the unauthorized removal of the leaves. Any other means for pivotally mounting the leaves or card holders A in the support B may be employed.

Figures 1, 2:
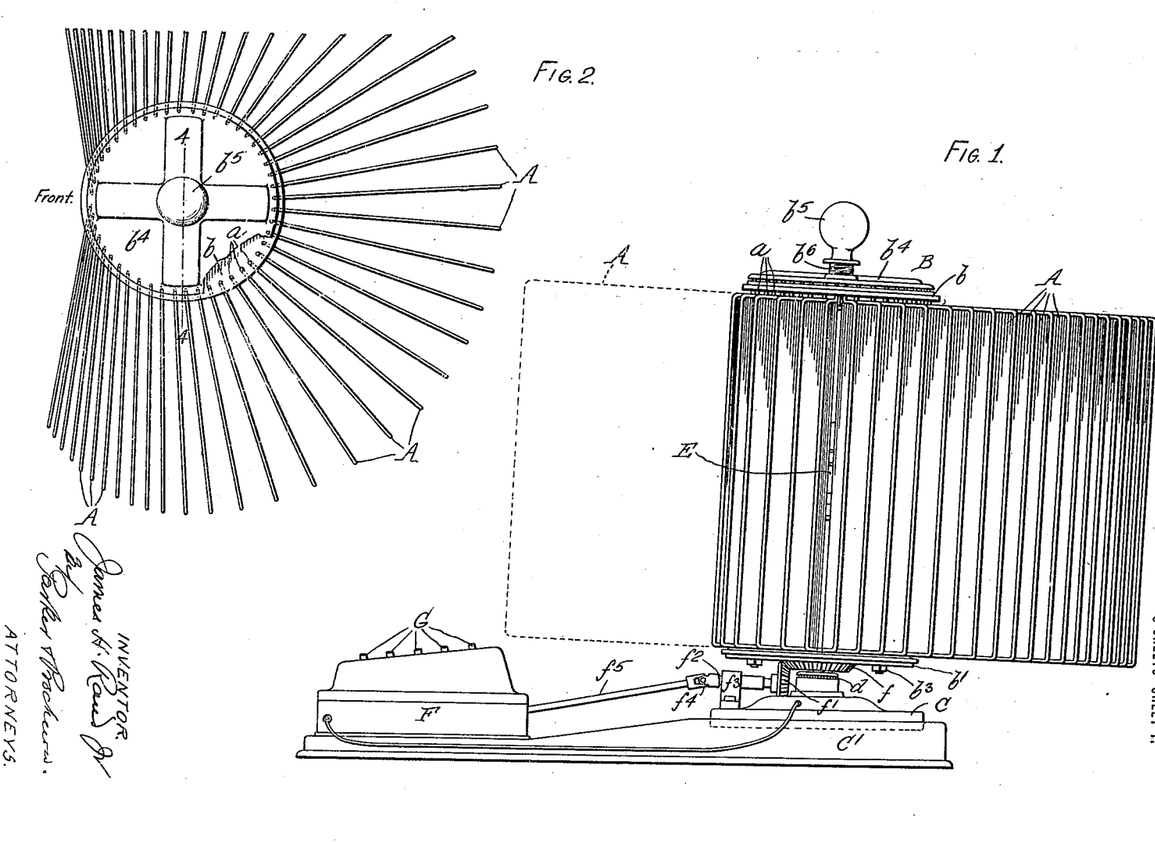
Fig. 1 is a side elevation of an index or display device embodying the invention.
Fig. 2 is a fragmentary top plan view of the support for the leaves or holders of the display device.

The leaf-supporting member B may be movably mounted in any suitable manner to bring one or another of the leaves into an accessible position, as at the front of the device. In the construction shown for this purpose the support B is rotatably mounted in a base C which is provided with an upright rod or part $c$ about which the support B is adapted to rotate and which is preferably arranged at a slight inclination from the vertical. The support B is provided with a sleeve D which is suitably secured thereto and which forms a bearing for the inclined shaft $c$ and a ball bearing $d$ is preferably arranged at the lower end of the leaf support B. The upper end of the sleeve D is connected with the support B by means of a plate $d'$ having holes through which the rods $b^2$ extend. By arranging the upright rod or shaft $c$ at an angle to the perpendicular, the leaves or card holders will tend to swing by gravity on their pivots into positions shown in Figs. 1 and 2. A spring finger or detent $c'$ is preferably provided which holds the leaves back until they have moved out of engagement with the detent, after which they swing by gravity about their pivots, owing to the inclination of the axis of the leaf support. A movable leaf support of any other construction may be employed.

Any suitable means may be employed for rotating the revolving support so as to bring the desired leaves into a position to be accessible from the front of the device. For this purpose a motor E is provided which may be arranged in any suitable part of the device, being in the construction shown arranged within the leaf-supporting member B. The motor is mounted on a base $e$ secured to the upper end of the inclined rod or shaft $c$ and the shaft $e'$ of the motor is provided with a worm $e^2$ adapted to drive a worm gear $e^3$ mounted on an upright shaft suitably journaled in the base $e$ of the motor and having a pinion $e^4$ thereon which is adapted to mesh with a gear $e^5$ secured on the plate or disk $d'$ of the leaf support B.

The motor E is started and stopped by means of a suitable controlling device F, which together with the base C of the leaf-supporting member B is mounted on a base C' or table and suitably connected with the rotating stand or support so that the rotation of the stand or support is communicated to the controlling device. In the construction shown for this purpose, the lower plate $b'$ of the rotating support is provided with a bevel gear $f$ secured thereto and adapted to engage a bevel gear $f'$ mounted on a shaft $f^2$ suitably journaled in a bearing $f^3$ mounted on the base C. The shaft $f^2$ is connected by means of a universal joint $f^4$ with a shaft $f^5$ connecting with the controlling device.

The controlling or selective device F shown in the drawings is adapted to start the operation of the motor and to cause the motor to stop when the leaf support B has been brought into the desired position. In the construction shown for this purpose the selective device includes a keyboard $g$ having a plurality of keys G corresponding in number to the number of positions in which the revolving stand is to be stopped. These keys, in the construction shown, are slidably arranged in the keyboard $g$, and the inner ends thereof are adapted to slidably engage with a guide plate $g'$, the keyboard and guide plate being suitably mounted in a housing $g^2$ enclosing the parts of the controlling device F.

$g^3$ represents indicating plates or cards arranged on the keyboard and each of which is arranged in proximity to the keys to indicate the leaf or leaves which will be brought into the open or accessible position by the actuation of the corresponding key. The means for starting the operation of the motor by depressing a key are preferably constructed as follows:—

The keys are arranged in rows extending transversely of the controlling device, and for each row of keys a plate H is provided which is pivoted on a rod $h$ secured on the guide plate $g'$ the plate H being so arranged relatively to a row of keys that any key of the row may engage the plate H and cause the plate to swing about the axis of the rod $h$. Each of the plates H is provided with an arm $h'$ straddling a switch-actuating rod I which is slidably arranged in brackets $i$ extending upwardly from a bottom plate $i'$ of the housing of the controlling device. Each of the arms $h'$ is adapted to engage a collar or projection $i^2$ on the switch-actuating rod so that when any of the plates H is swung about its pivot by means of a key, the corresponding arm $h'$ will engage its collar $i^2$ and move the rod I in a direction to cause the actuation of the motor E. This movement of the rod I is opposed by any suitable means, such as a spring $i^3$ engaging a sleeve $i^4$ on the rod I and one of the brackets $i$.

The rod I is provided with a switch K of any suitable construction adapted to close an electric circuit connecting the motor E with a suitable source of power for causing the rotation of the leaf-supporting stand when any of the keys G of the controlling device is depressed and to open the circuit when the key is released.

This switch K may be of any suitable or desired construction, that shown including a contact disk or plate $k$ mounted on and insulated from the rod I, and adapted to connect two spring contacts $k'$ and a disk $k^2$, preferably made of carbon, which is adapted to engage with two carbon terminals $k^3$, the disk or plate $k$ preferably engaging with the spring contacts after the carbon members are placed into engagement for the purpose of avoiding arcing between the spring contacts. Any other suitable switch may be employed for making and breaking the motor circuit.

Figure 13:
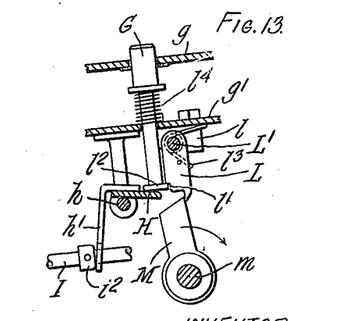
Fig. 13 is a view similar to Fig. 12, showing the parts in different positions.

Means are preferably provided for holding the keys G in their depressed position and the switch closed until the leaf-supporting stand is in the desired position and for automatically releasing the key and opening the switch when the stand reaches this position. These means preferably include dogs or latches L, one for each key, pivoted on rods L' which are mounted in lugs or parts $l$ arranged on the guide plate $g'$, the dogs being provided with notches $l'$ adapted to engage shoulders or parts $l^2$ on the lower ends of the keys. Each latch L is adapted to be moved into its key-engaging position, as shown in Fig. 13, by means of a spring $l^3$, and when in this position will hold the key in its lower or switch closing position against the action of a spring $l^4$ which returns the key to its normal or upper position when released from the latch L.

The keys are released to permit the switch K to be opened when the revolving support is in the desired position. This is accomplished in the construction shown by means of a plurality of trip arms M which are adapted to engage the dogs L to move the same out of holding engagement with the keys, one of these arms being provided for each key. The trip arms M are preferably mounted on shafts $m$ suitably journaled in the housing $g^2$ and adapted to be rotated by the movement of the leaf-supporting member B. In the construction shown, the rotation of the leaf supporting stand is transmitted to the shafts $m$ from the connecting shaft $f^5$ which is provided with a universal joint $n$ connected with a shaft $n'$ suitably journaled in bearings $n^2$ mounted on the base $i'$ of the controlling device and having a bevel gear $n^3$ secured thereon. The gear $n^3$ engages with a corresponding bevel gear $n^4$ mounted on one of the shafts $m$. The shafts $m$ are all suitably connected so that the rotation of one shaft will be transmitted to the other shafts. The shafts $m$ in the construction shown are provided with cranks $n'$ pivoted to a connecting rod $n^2$ so that all the shafts will rotate together. The described connection between the shafts $m$ is preferred because it eliminates practically all lost motion between the shafts. Each latch tripping arm M is so positioned relatively to its shaft $m$ as to cause the releasing of its key at the instant that the leaf support reaches the position controlled by the corresponding key. Any other means may be employed for causing the keys to return to their upper or switch opening positions.

In the operation of the machine, the depression of any key causes the key to engage the underlying plate H and to swing the plate on its pivot $h$ thereby causing the arm $h'$ to move the switch-actuating rod I to close the switch K. When the key is depressed the spring $l^3$ moves the dog L into a position to engage the shoulder or part $l^2$ of the key and hold the key in its depressed position, thus holding the switch K closed. This completes the circuit through the motor E and causes the motor to move the leaf support to bring the leaves A one after another to the front of the leaf support or into a position in which the leaves are exposed or accessible. The rotation of the leaf support is transmitted through the bevel gears $f$ $f'$, shafts $f^2$ $f^5$ and $n'$ and the bevel gears $n^3$ $n^4$, causing the rotation of all of the shafts $m$. When the leaf A corresponding to the key depressed comes to the intended position, the latch tripping arm M corresponding to the key which has been depressed will move the latch L out of its holding position and permit the spring $l^4$ to return the key to its normal or upper position and permit the spring $i^3$ to move the rod I into the switch-opening position, thus stopping the motor E and returning the plate H to its normal position. Owing to the pivotal arrangement of the leaves on the inclined axes, the leaves will swing on their pivots by gravity and the point at which the leaves will swing is preferably arranged at the front of the device, so that the desired leaf will automatically swing into the accessible position when the apparatus is stopped at a predetermined point corresponding to the leaf desired.

By means of the device described the leaf desired can be very quickly and accurately brought into the exposed position so that much time is saved in locating the desired card or other object on the leaf or holder. The entire operation of locating the desired leaf is automatic after the proper key corresponding to the leaf desired has been depressed.

I claim as my invention:

1. In an index or display device, the combination of a movable rigid support, a plurality of sections or segments mounted on said support, means for moving said support to bring one or another of said sections into a predetermined position, and selective means for stopping the movement of said support when the desired section is in said predetermined position.

2. In an index or display device, the combination of a plurality of leaves, a rigid support on which said leaves are mounted, motor driven means for moving said support to place one or another of said leaves into a predetermined position, and selective means for controlling said motor to stop the movement of said support when the desired leaf is in said predetermined operative position.

3. In an index or display device, the combination of a plurality of leaves, a rigid support on which said leaves are mounted, motor driven means for moving said support to place one or another of said leaves into a predetermined position, means for starting the operation of said motor, and selective means controlled by the rotation of said support for stopping said motor when the desired leaf is in said predetermined position.

4. In an index or display device, the combination of a movable rigid support, a plurality of leaves mounted on said support, means for moving said support to bring one or another of said leaves into a predetermined position, and keyboard controlled means for stopping the movement of said support when the desired leaf is in said predetermined position.

5. In an index or display device, the combination of a plurality of leaves, a horizontally movable support on which said leaves are mounted, motor driven means for moving said support horizontally to place one or another of said leaves into a predetermined position, and keyboard controlled means for starting the operation of said motor and for stopping said motor when the desired leaf is in said predetermined position.

6. In an index or display device the combination of a plurality of leaves, a support on which said leaves are mounted, a motor, and means driven by said motor for moving said support to place one or another of said leaves into a predetermined position, a switch controlling the operation of said motor, and controlling means for opening said switch to stop said support when the desired leaf is in said predetermined position.

7. In an index or display device, the combination of a plurality of leaves, a support on which said leaves are mounted, a motor, and means driven by said motor for moving said support to place one or another of said leaves into a predetermined position, a switch controlling the operation of said motor, and means operated by the movement of said support to open said switch when the desired leaf is in operative position.

8. In an index or display device, the combination of a plurality of leaves, a rigid support on which said leaves are mounted, a keyboard, driven means controlled by any key of said keyboard for moving said support, and means controlled by the keys to stop the movement of said support when the desired leaf is in said predetermined position.

9. In an index or display device, the combination of a plurality of leaves, a rigid support on which said leaves are mounted, a keyboard, means controlled by any key of said keyboard for moving said support to bring said leaves successively into a predetermined position, and connections between said keys and said support for stopping said support in said predetermined position corresponding to the key which has been actuated.

10. In an index or display device, the combination of a rigid support, a plurality of leaves mounted on said support, actuating means for separating said leaves one at a time to render the same accessible, and means for interrupting said actuating means when the desired leaf is accessible.

11. In an index or display device, the combination of a rigid support, a plurality of leaves mounted on said support, actuating means for separating said leaves one at a time to render the same accessible, and keyboard controlled means for interrupting said actuating means when the desired leaf is accessible.

12. In an index or display device, the combination of a horizontally movable support, a plurality of leaves mounted on said support, motor driven means for separating said leaves one at a time to render the same accessible, and controlling means for stopping said motor driven means when the desired leaf is accessible.

13. In an index or display device, the combination of a rotatable rigid support, a plurality of object holders mounted on said support, means for rotating said support, and keyboard controlled means for stopping said support when the desired holder is in operative position.

14. In an index or display device, the combination of a rotatable rigid support, a plurality of leaves pivotally mounted on said support, a motor for rotating said support to bring said leaves one at a time into an operative position, a keyboard comprising a plurality of keys each of which is adapted to be moved into a position to start the operation of said motor, and means operated by the rotation of said support for returning the key to its original position when the leaf corresponding to said key is in operative position.

15. In an index or display device, the combination of a movable rigid support, a plurality of leaves pivoted on said support, means arranged in the path of movement of said leaves to separate adjacent leaves to render the same accessible, and means for stopping the movement of said support when the desired leaf is accessible.

16. In an index or display device, the combination of a support adapted to be rotated on an inclined axis, a plurality of leaves pivoted on said support and adapted to separate by gravity at one point of their path of movement, and selective means for stopping the movement of said support when the desired leaf has reached said point.

17. In an index or display device, the combination of a movable support, a plurality of leaves mounted on said support, a motor arranged within said support for actuating the same to bring said leaves one at a time into an operative position, and means for controlling the operation of said motor to stop the movement of said support when the desired leaf is in operative position.

18. In an index or display device, the combination of a horizontally movable support, a plurality of leaves pivoted on said support, means for moving said support to bring the desired leaf into an accessible position, and means for causing the leaves to swing on their pivots to expose the desired leaf.

19. In an index or display device, the combination of a plurality of pivotally connected leaves adapted to move in a path arranged at an inclination to the horizontal, means for causing said leaves to move in said path, said leaves when reaching a part of said path being caused to swing about their pivots to expose one or another of said leaves, and selective means for stopping the movement of said leaves when the desired leaf is in exposed position.

20. In an index or display device, the combination of a plurality of pivotally connected leaves adapted to move in a path arranged at an inclination to the horizontal, means for causing said leaves to move in said path, said leaves when reaching a part of said path being caused to swing by gravity about their pivots to expose one or another of said leaves, and keyboard controlled means for causing the leaves to stop when the desired leaf is exposed.

21. In an index or display device, the combination of a plurality of pivotally connected horizontally movable leaves, a motor for moving said leaves to bring the same one at a time into an accessible position, means for swinging said leaves on their pivots to expose the leaves when in said accessible position, and keyboard controlling means for stopping the operation of said motor when the desired leaf is in said accessible position.

22. In an index or display device, the combination of a plurality of leaves, a supporting member for said leaves including upper and lower parts in which said leaves are pivotally mounted and a motor arranged between said upper and lower parts for rotating said support.

23. The combination with an index or display device having a plurality of horizontally movable leaves adapted to be moved one at a time into an accessible position, a motor for moving said leaves, a keyboard for controlling the operation of said motor, said keyboard including a plurality of keys, means actuated by any of said keys for starting the operation of said motor, and means for returning the key to its initial position to stop the operation of said motor when the desired leaf is in the accessible position.

24. The combination with an index or display device having a plurality of leaves adapted to be moved one at a time into an accessible position, a motor for moving said leaves, a keyboard for controlling the operation of said motor, said keyboard including a plurality of keys, a switch adapted to be closed to cause the operation of the motor when any of said keys is actuated, and means controlled by the movement of the means to open said switches and return the key to its initial position when the desired leaf is in the accessible position.

25. The combination with an index or display device having a plurality of leaves adapted to be moved one at a time into an accessible position, a motor for moving said leaves, a keyboard for controlling the operation of said motor, said keyboard including a plurality of keys, a switch adapted to be closed when any of said keys is actuated to cause the operation of the motor, a latch for holding the key in depressed position, and means operated by the movement of said leaves to release said key for opening said switch and permitting the key to return to its initial position.

26. The combination with an index or display device having a plurality of movable leaves, of a motor for moving said leaves, a controlling device for said motor including a plurality of keys, a switch for controlling the operation of said motor, mechanism connecting said keys and said switch for closing said switch when any of said keys are actuated, means for releasably holding said keys in the switch closing positions, and means actuated by the movement of said leaves for releasing said keys to open said switch.

27. The combination with an index or display device having a plurality of movable leaves, of a motor for moving said leaves, a controlling device for said motor including a plurality of keys, a switch for controlling the operation of said motor, mechanism connecting said keys and said switch for closing said switch when any of said keys are actuated, means for releasably holding said keys in the switch closing positions, and releasing devices for each of said keys which are operated by the movement of said leaves and which releases a key when the leaf corresponding thereto is in the desired position.

28. The combination with an index or display device having a plurality of movable leaves, of a motor for moving said leaves, a controlling device for said motor including a plurality of keys, a switch for controlling the operation of said motor, mechanism connecting said keys and said switch for closing said switch when any of said keys are actuated, a latch for each key for holding the same in switch closing position, and a latch releasing member for each key, said member being actuated by the movement of the leaves and causing the latch to release the key when the leaf corresponding to said key is in operative position.

29. The combination with an index or display device having a plurality of leaves adapted to be moved one at a time into an accessible position, of a motor for moving said leaves, a keyboard for controlling the operation of said motor, said keyboard including a plurality of keys, movable means controlled by any of said keys for starting said motor, whereby when one of said keys is depressed said motor will be started to move the leaves, independent means for locking said keys in depressed position, and means operated by movement of said leaves for actuating said locking means to release said keys when the leaves have been moved to a predetermined position by said motor.

30. The combination with an index or display device having a movable rigid support with a plurality of leaves mounted thereon, whereby when said support is moved the leaves will be placed one at a time into an accessible position, of a motor for moving said support, a keyboard for controlling the operation of said motor, said keyboard including a plurality of keys, movable means controlled by any of said keys for starting said motor, whereby when one of said keys is depressed said motor will be started to move said support, means for automatically locking said keys in their depressed positions, and means connected to and operated by movement of said movable support for releasing said keys when said leaves have been moved to a predetermined position.

31. The combination with an index or display device having a movable support with a plurality of leaves mounted thereon, whereby when said support is moved the leaves will be placed one at a time into an accessible position, of a motor for moving said support, a keyboard for controlling the operation of said motor, said keyboard including a plurality of keys, a movable circuit making member adapted to open and close the circuit to said motor, movable devices operated by said keys for actuating said circuit making member to close the circuit upon depression of any of said keys, means for automatically locking said keys in depressed position, and means connected to and operated by said movable support for automatically releasing said keys when the leaves have been moved to a predetermined position.

32. The combination with an index or display device having a movable support with a plurality of leaves mounted thereon, whereby when said support is moved the leaves will be placed one at a time into an accessible position, of a motor for moving said support, a keyboard for controlling the operation of said motor, said keyboard including a plurality of keys, a movable circuit making member adapted to open and close the circuit to said motor, movable devices operated by said keys for actuating said circuit making member to close the circuit upon depression of any of said keys, means for automatically locking said keys in depressed position, and lock-tripping means and connections between said lock-tripping means and said movable support, whereby said lock-tripping means are actuated upon movement of said support, said lock-tripping means having parts arranged to contact with and release said locking means in different intervals of time, whereby depression of different keys of said keyboard will produce different movements of said support.

33. The combination with an index or display device having a movable support with a plurality of leaves mounted thereon, whereby when said support is moved the leaves will be placed one at a time into an accessible position, of a motor for moving said support, a keyboard for controlling the operation of said motor, said keyboard including a plurality of keys, a switch for controlling the operation of said motor, means acting on said switch and constantly tending to open the circuit to said motor, means acted upon by said keys, whereby actuation of any of said keys will operate said switch to close said circuit, means for locking said keys in depressed position, and means operatively connected to said support and driven thereby for releasing said locking means when said movable support has been moved to a predetermined extent.

34. In an index or display device, the combination of a movable support, a plurality of leaves pivoted on said support to swing about substantially vertical axes, driven means for moving said support to bring one or another of said leaves into a predetermined position, and a key-board having selective means for controlling said driven means to move said support through predetermined distances to position said leaves.

Witness my hand this 9th day of December, 1919.

JAMES H. RAND, Jr.

Witnesses:
 E. P. GRAY,
 M. J. SMITH.